Sept. 29, 1936.  V. DAHLMAN  2,056,001

IMPERMANENT AIR FILTER MEDIUM

Filed Nov. 28, 1934

INVENTOR.
Verner Dahlman
BY Arthur Robert
ATTORNEY

Patented Sept. 29, 1936

2,056,001

UNITED STATES PATENT OFFICE 2,056,001

IMPERMANENT AIR FILTER MEDIUM

Verner Dahlman, New Lenox, Ill., assignor to Independent Air Filter Company, Chicago, Ill., a corporation of Illinois Application November 28, 1934, Serial No. 755,163

1 Claim. (Cl. 183—45)

Air filter mediums may be generally classed as permanent and impermanent. The permanent mediums—which are intended to be recleaned at desired intervals over long periods of use—are largely composed of relatively expensive and lasting materials, usually metallic, whereas the impermanent mediums—which are to be discarded after a relatively short period of use involving little or no cleaning—are, from economic necessity, more or less restricted to relatively inexpensive materials which may be of a lasting nature, but which generally are relatively short-lived. The present invention, which relates to this latter or impermanent class of mediums will, perhaps, be better understood after a brief reference to the use of excelsior as an impermanent filter medium.

Excelsior is desirable because it is filamentous, readily and inexpensively available in quantities as small or large as may be desired, easily packed to form a filter medium of desired and uniform density, and easily destroyed after use. Furthermore, while it may be used as a dry filter medium, its oil absorbing property renders it highly useful as a filter medium of the viscous impingement type. This material, however, has not come into extensive use largely because it is composed of large and small lengths of excelsior filaments which cannot be easily separated, and because its brittleness causes some of the long filaments to break into small lengths when subjected to vibration, rough handling or undue strain. These small lengths not only are substantially useless from the filtering standpoint, but are likely to be carried into the clean air duct where they sometimes occasion damage and are always otherwise objectionable.

The principal object of the present invention is to provide an impermanent filter material having the advantages of excelsior but none of its disadvantages.

The invention is illustrated in the accompanying drawing, wherein.

Figure 1:
Figure 1 is an elevation of the filter element.
Figure 3:
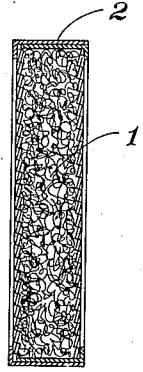
Figure 2 is a front elevation of a suitable filter cell or casing within which a series of filter elements may be arranged to form the filter medium and Figure 3 is the section along line 3—3 of Figure 2.
Figure 2:
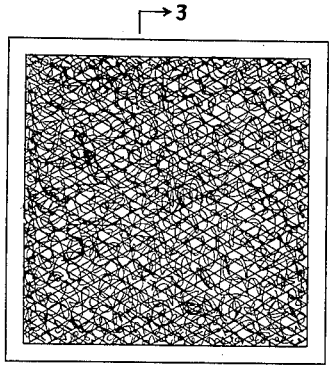

In accordance with my invention, I propose the use of long moss as a filter medium, this material being commonly termed Spanish moss. This filamentous material, which is designated by the numeral "1" is available, at low cost, in small or large quantities, easily packed to form a filter medium of desired and uniform density, and easily destroyed after use. It is not only suitable for use as a dry filter medium, but I have found that it will absorb oil to an extent which makes its use as a viscous impingement medium highly satisfactory. Instead of being brittle, it is both tough and pliable and, therefore, has no tendency to break into small lengths when subjected to vibration or when bent and twisted as it will ordinarily be during the packing operation. As supplied, however, Spanish moss usually includes many filaments which are short enough to be objectionable. This objection is not a serious one inasmuch as the short lengths can be easily and quickly removed by combing the material, a procedure which is not feasible with excelsior and other similar materials.

The moss may be arranged in any suitable manner as by packing it into a tangled mass to form a maze of tortuous air passages within a casing 2 having front and rear open or screen covered faces which permit the air to pass into and out of the casing. The filter thus formed may be operated as a dry filter, or, the filter medium may be coated with oil or some other viscous material, and the filter operated as one of the viscous impingement type. The efficiency of a filter of this character is very high and its ability to accumulate dust and other particles, without a rapid increase in resistance, is extremely satisfactory. After a suitable period of use, the filter medium may be removed and destroyed by burning or otherwise, or, if desired, the casing 2 may be composed of a burnable material and the entire filter unit discarded. Because of the advantages of this material, it will be readily appreciated that it makes possible the production of an efficient and otherwise unobjectionable filter at a cost which is low enough to permit its being entirely discarded after a suitable interval of use.

Having described my invention, I claim:

A filter medium comprising combed Spanish moss arranged in a mass to define a maze of tortuous passages.

VERNER DAHLMAN.